June 26, 1928.
W. J. EVERETT
FEED WATER HEATER AND PURIFIER
Filed July 21, 1924
1,674,820
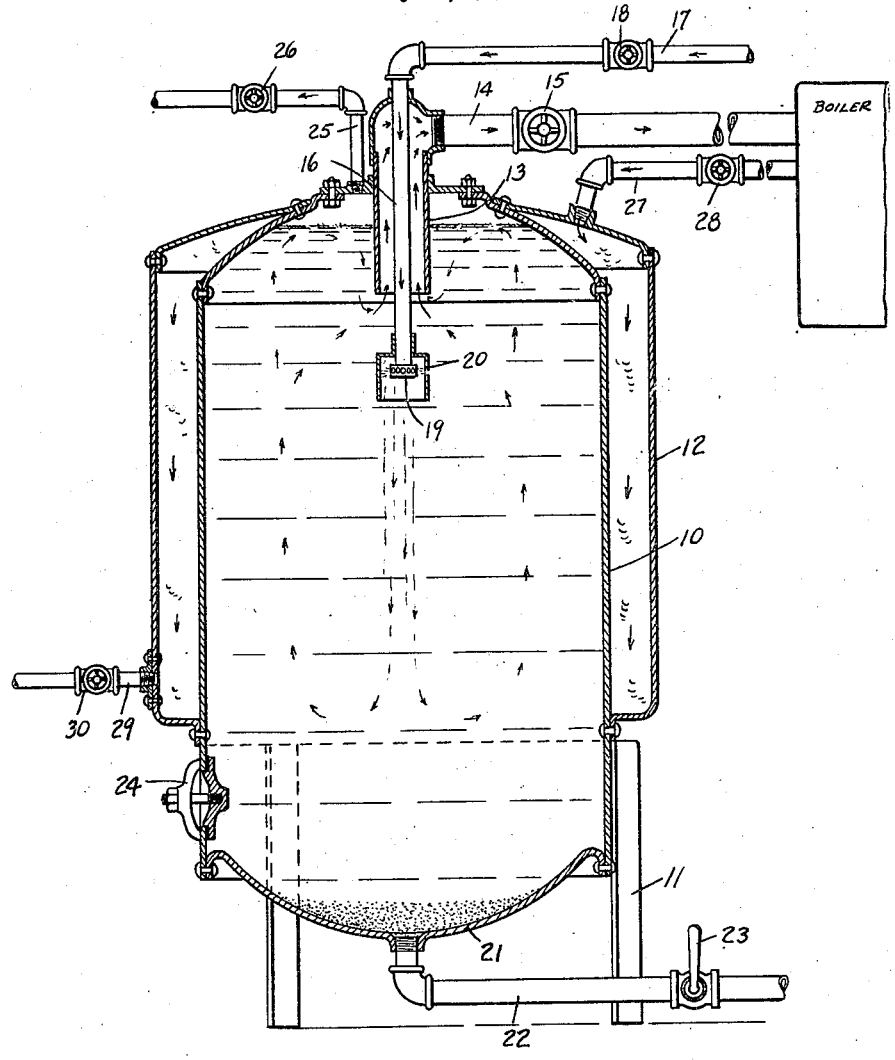
INVENTOR.
WILLIAM J. EVERETT.
BY
ATTORNEYS.

Patented June 26, 1928.

1,674,820

UNITED STATES PATENT OFFICE.

WILLIAM J. EVERETT, OF INDIANAPOLIS, INDIANA.

FEED-WATER HEATER AND PURIFIER.

Application filed July 21, 1924. Serial No. 727,340.

This invention relates to a feed water heater and purifier for boilers.

The object of the invention is to provide a simple and reasonably inexpensive device for heating and causing the precipitation of the foreign matter and impurities from the water prior to its passage into the boiler.

It is well known that the water usually obtainable for boilers comprises an appreciable percent of lime or other impurities, which is precipitated and deposited in the boiler or boiler tubes by the high heating of the water, thereby forming a hard scale. This scale is not only injurious to the boiler and tubes, but causes the waste of fuel by retarding the heat of the water. It forms a sort of insulation for the boiler and tubes and causes a greater amount of heat energy to be expended to heat the water to a given degree than would be necessary with the scale eliminated.

It is the object of this invention to employ heat derived from the steam of the water to heat a precipitating drum into which the fresh water supply is discharged, such water being heated by a surrounding steam jacket, or internal steam pipes to a sufficiently high degree of temperature to cause it to precipitate the lime and other foreign matter in the drum and then pass on into the boiler relatively free therefrom.

One of the most important features, however, is the arrangement of the heating jacket or pipes, wherein they extend only partially to the bottom of the drum, leaving the lower portion thereof relatively free from heat. This prevents the baking and caking of the precipitated lime or other foreign matter, leaving it in the form of a mud, and thereby permitting its ready removal.

The full nature of the invention will be understood from the accompanying drawings and the following description and claims:

In the drawings, there is shown a central vertical section through the feed water heater and purifier adapted to be connected with a stationary boiler.

In the drawings there is shown a precipitating drum 10 supported upon suitable legs 11 the upper portion thereof being surrounded by a steam jacket 12. Opening into the top of the drum there is a relatively large outlet pipe 13 connected with a pipe 14 leading to the boiler for permitting the flow of water from the drum to the boiler, said pipe 14 being controlled by a valve 15. Extending through the relatively vertical outlet pipe 13 there is a relatively small inlet pipe 16 communicating with a water supply pipe 17 leading from a suitable water supply and controlled by a valve 18. The inlet pipe 16 projects downwardly through the outlet pipe 13 to a point below the outlet and is provided on the end thereof with a spray nozzle 19 enclosed by a downwardly opening protecting cap 20. The bottom 21 of the drum is dished so that the sediment or precipitated matter will be gathered in the center thereof and be drained out through drain pipe 22 controlled by a valve 23. Adjacent the bottom 21 and in the wall thereof there is a hand hole and plate 24 for permitting the interior of the drum to be cleaned. The top of the drum is provided with a small pipe 25 which is controlled by a valve 26, so arranged as to permit any foreign matter, which may rise to the surface of the water, to be drained off.

The steam jacket which surrounds the drum, and particularly the upper portion thereof, is connected by a pipe 27, which is controlled by a valve 28, with the steam boiler, whereby a supply of steam may be furnished from the boiler to the steam jacket. The pipe 27 communicates with the steam jacket at the top thereof and a pipe 29, controlled by a valve 30, is connected adjacent the bottom thereof for permitting such water as may gather in the bottom of the jacket by reason of condensation of the steam, to be drawn off.

In operation, the live steam entering the steam jacket will highly heat the drum and cause the temperature of the water contained therein, particularly the water adjacent the wall of the drum, to be heated. The feed water, which would be relatively cool, entering through the spray nozzle and will drop toward the bottom of the drum, gathering or becoming mixed with the heated water on its way down until it reaches the maximum temperature of the surrounding water. This temperature is more than sufficient to cause full precipitation of the foreign matter contained in the feed water, the foreign matter passing by gravity to the bottom of the drum.

The water, freed of the foreign matter and being heated to the maximum temperature, will then rise along the sides of the drum adjacent the steam jacket until it reaches the upper portion of the drum and passes through the outlet 13 into the boiler. The water, therefore, will be perceived to take a path substantially as indicated by the arrows. It will be observed that this simple structure will cause the purification of the water sufficient to not only eliminate the formation of more scale on the boiler, but the purified water will remove the old scale to a large degree, by the absorption thereof during its passage through the boiler.

The invention claimed is:

1. A feed water heater and purifier for boilers comprising a precipitating drum, means for heating the feed water therein adjacent the surrounding walls thereof, a water supply pipe extending therein having its discharge end positioned substantially in the center of said drum and near the top thereof, and an outlet pipe having its intake end spaced above the discharge end of said supply pipe.

2. A feed water heater and purifier for boilers comprising a precipitating drum, means for heating the feed water therein adjacent the surrounding walls thereof, a water supply pipe extending therein having its discharge end positioned substantially in the center of said drum and near the top thereof, an outlet pipe having its intake end spaced above the discharge end of said supply pipe, and a precipitant receiving chamber extending below the heated portion of said drum so as not to be affected by the heat thereof for receiving and retaining the precipitant in a comparatively cool state for preventing its becoming hardened due to heat.

3. A feed water heater and purifier for boilers comprising a precipitating drum, means for heating the feed water therein about the adjacent walls thereof, a water supply pipe extending into said drum for discharging feed water therein, an outlet pipe having its intake end spaced from the discharge end of said supply pipe, and a precipitant receiving chamber spaced below said heating means so as to remain relatively cool for receiving the precipitant and preventing the hardening thereof.

In witness whereof, I have hereunto affixed my signature.

WILLIAM J. EVERETT.